US010046249B2

(12) United States Patent
Zimmer

(10) Patent No.: US 10,046,249 B2
(45) Date of Patent: Aug. 14, 2018

(54) COMPACT MECHANICAL VAPOR RECOMPRESSION EVAPORATOR SYSTEM

(71) Applicant: Caloris Engineering, LLC, Easton, MD (US)

(72) Inventor: Artur G. Zimmer, Oxford, MD (US)

(73) Assignee: Caloris Engineering, LLC, Easton, MD (US)

( * ) Notice: Subject to any disclaimer, the term of this patent is extended or adjusted under 35 U.S.C. 154(b) by 0 days.

(21) Appl. No.: 15/054,321

(22) Filed: Feb. 26, 2016

(65) Prior Publication Data

US 2016/0250563 A1 Sep. 1, 2016

Related U.S. Application Data

(60) Provisional application No. 62/121,545, filed on Feb. 27, 2015.

(51) Int. Cl.
*B01D 1/28* (2006.01)
*B01D 1/06* (2006.01)

(52) U.S. Cl.
CPC ........... *B01D 1/2887* (2013.01); *B01D 1/065* (2013.01); *B01D 1/289* (2013.01)

(58) Field of Classification Search
CPC ...... B01D 1/2887; B01D 1/065; B01D 1/289; B01D 1/28
See application file for complete search history.

(56) References Cited

U.S. PATENT DOCUMENTS

| 3,190,817 | A | | 6/1965 | Neugebauer et al. |
| 3,575,814 | A | | 4/1971 | Bahrenburg |
| 3,695,327 | A | | 10/1972 | Widmer |
| 4,287,019 | A | | 9/1981 | Standiford |
| 4,342,624 | A | | 8/1982 | Chute et al. |
| 4,536,528 | A | | 8/1985 | Esko Huhta-Koivisto |
| 4,710,272 | A | | 12/1987 | Passarelli et al. |
| 5,221,439 | A | | 6/1993 | Li et al. |
| 6,089,312 | A | * | 7/2000 | Biar ................ F28D 3/02 165/115 |
| 6,190,438 | B1 | * | 2/2001 | Parks ............... B01D 45/16 162/189 |
| 2004/0206279 | A1 | * | 10/2004 | Wark ................ F23K 3/02 110/104 R |
| 2012/0261089 | A1 | | 10/2012 | Steinbauer et al. |

FOREIGN PATENT DOCUMENTS

| FR | 2593718 A1 * | 8/1987 | ............ B01D 1/065 |
| WO | WO 1995/021009 A1 | 8/1995 | |
| WO | WO 9521009 A1 * | 8/1995 | ........... B01D 1/2887 |

OTHER PUBLICATIONS

Gupta, 2012, Power plant engineering. PHI Learning Pvt. Ltd.*

(Continued)

*Primary Examiner* — In Suk C Bullock
*Assistant Examiner* — Youngsul Jeong
(74) *Attorney, Agent, or Firm* — Finnegan, Henderson, Farabow, Garrett & Dunner LLP

(57) ABSTRACT

The system may include a vapor separator, a falling film evaporator, and a mechanical vapor recompression device. The system may also include a spin vane positioned at the inlet to the vapor separator. The falling film evaporator may surround an outer wall of the vapor separator, defining a common vessel.

17 Claims, 7 Drawing Sheets

(56) References Cited

OTHER PUBLICATIONS

Shalaby et al.. 2005, Comparative study of the continuous phase flow in a cyclone separator using different turbulence models, International journal for numerical methods in fluids, 48(11), 1175-1197.*
Perlekar et al., 2012, Droplet size distribution in homogeneous isotropic turbulence, Physics of Fluids, 24.6: 065101.*
Ramaswamy et al., 2006, Food processing: Principles and applications, Boca Raton, Fla: Taylor & Francis.*
Ghosal et al., 2011, Introduction chemical engineering, New Delhi: Tata McGraw Hill Education Private Limited.*
FR 2593718 A1 )_English translation.*
PCT Notification of Transmittal of the International Search Report and the Written Opinion of the International Searching Authority issued in International Application No. PCT/US2016/19700, dated May 27, 2016.
Caloris™ Thermal Process Technology, "Caloris Concentrix™ MVR Compact Evaporator," Brochure, published Sep. 2013, 2 pages.

\* cited by examiner

COMPACT MECHANICAL VAPOR RECOMPRESSION EVAPORATOR SYSTEM

RELATED APPLICATIONS

This application claims the benefit of U.S. Provisional Application No. 62/121,545, filed Feb. 27, 2015, which is incorporated by reference in its entirety.

TECHNICAL FIELD

The present disclosure relates to a compact mechanical vapor recompression (MVR) evaporator system, and more particularly, to a Concentrix (CC) MVR evaporator system.

BACKGROUND

Evaporator systems use thermal separation technology and can be used for the concentration or separation of liquid solutions, suspensions and emulsions. During evaporation, a solution is concentrated when a portion of the solvent, usually water, is vaporized, leaving behind concentrate that contains virtually all of the dissolved, suspended or emulsified solids, or solute, from the original feed.

Evaporation is a valuable process technology in a variety of fluid processing industries. For example, evaporation is a valuable process technology in the food, dairy, and beverage industry for concentrating a product (e.g., sugar, milk, proteins, carbohydrates, etc.). Evaporation is also a valuable process in the wastewater treatment industry, particularly where evaporation is considered an alternative process in an increasing number of wastewater treatment applications. It can be effective for concentrating or separating from the solvent salts, heavy metals and a variety of hazardous materials. Also, it may be used to recover useful by-products from a solution, or to concentrate liquid wastes prior to additional treatment and final disposal. Many applications of the technology also produce a reusable water stream, which is a valuable feature where water conservation is a priority or mandated by local regulations and laws.

A drawback of traditional evaporator systems is that they can constitute a significant capital investment that many businesses may not be able to afford. Depending on the capacity required by a process or application, the size of an evaporator system can be large, requiring substantial capital investment to purchase the equipment and for the facility to house the equipment, including ancillary equipment (e.g., feed tanks, heaters, cleaning systems, etc.), and installation (e.g., foundations, structural support steel, piping, electrical, etc.). Therefore, there is a need to improve the technology to make it more compact and affordable.

In response to this need, in 2011, Caloris Engineering, LLC ("Caloris") introduced the CC1 Concentrix compact mechanical vapor recompression (MVR) evaporator system. Subsequently, in 2013, Caloris introduced the CC2 Concentrix compact MVR evaporator system. The CC1 and CC2 (collectively "first generation CC" systems) were designed and engineered to offer the high overall energy efficiency of falling film MVR evaporators in a compact design.

Falling film evaporators utilize a vertical tube and shell heat exchanger to heat the mass of a liquid flowing downward via gravity inside the tubes by transfer of thermal energy through the tube wall from the condensation of vapors on the outside of the tube wall. Typically, an induced draft at the lower end of the heat exchanger bundle promotes the flow of evaporated vapors co-current with the liquid vertically down the inside of the tubes. As the liquid and vapor exit the tubes at the lower end of the tube bundle, the liquid continues to fall under gravity downward into a liquid sump, while the vapor is drawn away from the liquid phase by the induced draft.

A variety of mechanical recompression devices (e.g., turbofan, rotary compressor, etc.) can be used to induce the draft of evaporated vapors from the bottom of the tube bundle. A separation chamber can be used to supplement the separation of entrained liquid droplets from the vapor flow prior to the mechanical recompression device. Mechanical compression of the vapors in the mechanical recompression device increases the temperature of those vapors. The discharge flow of vapors from the mechanical compression device can then be directed into the shell of the heat exchanger bundle, where those vapors then condense on the outside of the tubes transferring thermal energy to the liquid inside the tubes. The liquid phase of condensed vapors on the outside of the tubes flows to the bottom of the tubes via gravity, for removal and collection separate from the concentrated liquid stream.

One aspect of the first generation CC systems, which contributed to the high overall energy efficiency compared to that of existing falling film evaporator systems, was the configuration of the falling film heat exchanger and the vapor separator as one common assembly. Specifically, the first generation CC design comprised the falling film heat exchanger bundle as a larger cylinder around the outside walls of the central cylindrical vapor separator body. The vertical cylinder walls of the vapor separator also served as the inside cylinder wall of the heat exchanger bundle. In addition, the lower portion of the vapor separator was open fully 360° around its circumference to the space directly beneath the falling film heat exchanger bundle. This allowed vapor flowing out of the inside of the heat exchanger tubes at the bottom of the exchanger bundle to be drawn horizontally inward into the vapor separator chamber without the need for interconnecting duct work.

Due to the flow of evaporated vapors into the bottom of the vapor separator cylinder from all sides 360° around its circumference, the vapor separator for the first generation CC systems was configured as a gravity separator, requiring that the cylinder diameter of the chamber be specified to achieve a vapor flow rise velocity inside the vapor separator vessel at a rate sufficiently low enough to allow a portion of the entrained liquid droplets in the vapor flow to fall via gravity downward in counter flow to the rising vapor flow created from the induced draft of the mechanical vapor recompression device, with the liquid droplets falling into a liquid collection sump directly beneath the separator cylinder.

At the top of the vapor separator cylinder was a ceiling wall surface, which connects to the inner wall of the cylinder, and had a circular opening at the center of the ceiling through which evaporated vapors rising vertically up through the cylinder passed. Directly beneath and connected to the circular hole in the ceiling was a transition section of a conical or similar rounded shape that was of smaller diameter at its top than at its bottom, which served to direct the flow of vapors from the outer portions of the upper cylinder volume toward the circular opening in the ceiling.

Mounted directly above the circular opening in the ceiling was a traditional turbofan impeller wheel, supported on a vertical shaft in a horizontal orientation with the vertical centerline of the cylinder. The diameter of the circular opening in the ceiling of the vapor separator was specified to be somewhat smaller than the diameter of the turbofan impeller wheel, allowing the flow of vapor passing through the ceiling's circular opening to enter at a perpendicular angle into the center of the turbofan impeller wheel. By spinning the turbofan impeller wheel, the surfaces of the impeller wheel mechanically displaced the vapors that were drawn into the center of the impeller wheel, causing those vapors to be pushed radially outward 360° in a horizontal plane from the outer perimeter of the spinning impeller wheel.

Mounted in a horizontal orientation around the outer circumference of the turbofan impeller wheel was a radial diffuser functioning as the mechanical recompression device, which achieved compression of the vapors being pushed radially outward 360° from the spinning turbofan impeller wheel by mechanically imposing backpressure on the vapors, similar to the compression of vapors that is more commonly achieved using a traditional scroll housing around a turbofan impeller wheel. Traditional scroll turbofan housings fully enclose the impeller and a discharge nozzle in the outer perimeter of the scroll housing can direct the discharge flow of vapor through ductwork to the shell of the heat exchanger. Instead, the radial diffuser of the CC system allowed the vapor to continue flowing radially outward 360° generally in a horizontal plane from the outer edge of the rotating impeller wheel and through the diffuser body, with the internal vanes of the radial diffuser compressing the vapor as it passed through the radial diffuser. The radial diffuser design directed the compressed vapor directly into the shell of the evaporator's falling film heat exchanger surrounding the vapor separator vessel 360° around its circumference. This design required no ductwork to interconnect the vapor outlet of the vapor separator and the suction inlet of the turbofan impeller. A nominal length of a straight ductwork channel may have been used between the outer edge of the radial diffuser body and the inner cylinder walls of the heat exchanger shell.

The present disclosure provides and describes a second generation Concentrix evaporator system, which is an improved design of the first generation CC. According to the embodiments of the present disclosure, this includes enhanced performance of the vapor separator by increased separation of entrained droplets within the vapor separator while maintaining a common vessel of limited diameter such that it is still capable of transportation over public roads.

It is understood that the use of a compact MVR evaporator system of the present disclosure is not limited in its application. The compact MVR evaporator system of the disclosure can be used in a variety of applications, for example, concentration of food and beverage products (e.g., sugars, juices, jellies, purees, pectin, brewer's yeast, beer dealcoholization, beer wort, stillage, coffee, gelatin, mash, starch, yeast extract, dairy products); processing spent liquids in the pharmaceutical and life science industries; concentration of select chemicals; wastewater from chemical processes; metal surface treatment effluent; food processing waste streams; recovering oil and water from emulsions from metal processing operations and foundries used in the automotive industries; concentration of wastewater from dye operations; cleaning waste streams (from component cleaning, tank cleaning, polishing and pretreatment cleaning); recover water from industrial laundries wastewater, boiler and cooling tower blow down; to name just a few.

SUMMARY

In one aspect, the present disclosure is directed to a compact mechanical vapor recompression evaporator system. The system may include a vapor separator, a falling film evaporator, a mechanical vapor recompression device, and a spin vane positioned at the inlet to the vapor separator. The falling film evaporator may surround an outer wall of the vapor separator, forming and defining a common vessel.

In another aspect, the present disclosure is directed to a compact mechanical vapor recompression evaporator system. The system may include a vapor separator that defines a chamber and a spin vane. The system may also include a falling film evaporator comprising a vertical tube and shell heat exchanger configured to surround the outer wall of the vapor separator forming a common vessel. The system may further include a mechanical vapor recompression device located above the vapor separator in fluid communication with the chamber and the shell of the heat exchanger and configured to induce a draft within the tubes of the heat exchanger through the spin vane and the chamber to the mechanical vapor recompression device. The draft may cause a vapor formed in the tubes of the heat exchanger as a result of evaporation to flow down through the tubes to the bottom of the heat exchanger, through the spin vane, into the chamber of the vapor separator, and into the mechanical vapor recompression device where it is compressed, increasing its temperature, and discharged into the shell of the heat exchanger to contact the outer walls of the tubes and form a condensate.

In another aspect, the present disclosure is directed to a method of separating a fluid using a compact mechanical vapor recompression evaporator system. The method may include supplying a liquid stream to a falling film evaporator and heating the liquid stream to facilitate evaporation of a portion of the liquid producing a vapor stream and a concentrated liquid stream. The method may also include drawing the vapor stream from the evaporator through a spin vane into a vapor separator chamber using a mechanical vapor recompression device, wherein the spin vane causes swirling of the vapor stream within the vapor separator promoting coalescing of a plurality of liquid droplets entrained in the vapor stream. The method may further include compressing the vapor stream from the vapor separator chamber using the mechanical vapor recompression device and discharging the compressed vapor stream into a shell of the evaporator so that the vapor stream can condense while heating the liquid stream passing through the evaporator.

Additional objectives and advantages of the present disclosure will be set forth in part in the description which follows, and in part will be obvious from the description, or may be learned by practice of the present disclosure. The objectives and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

DETAILED DESCRIPTION

The present disclosure is described herein with reference to illustrative embodiments for a particular application. It is understood that the embodiments described herein are not limited thereto. Those having ordinary skill in the art and access to the teachings provided herein will recognize additional modifications, applications, embodiments, and substitution of equivalents that all fall within the scope of the present disclosure. Accordingly, the present disclosure is not limited by the foregoing or following descriptions.

As described above, the first generation CC vapor separator was configured as a gravity separator, with the cylinder diameter of the chamber specified to achieve a vapor flow rise velocity inside the chamber at a rate sufficiently low enough to allow a portion of the entrained liquid droplets in the vapor flow to fall via gravity downward into a liquid sump. A disadvantage of the first generation design is that only a portion of the entrained liquid droplets fall via gravity downward against the flow of the vapor stream rising vertically upward through the separator vessel and thus separate from the vapor stream. The portion that fall via gravity and separate from the vapor stream are droplets of sufficient size and mass to fall via gravity against the rising vapor stream. In contrast, smaller droplets which are not of sufficient size or mass can therefore be entrained into the rising vapor stream and may be carried by the draft up through the vapor separator. Failure to separate the smaller entrained droplets diminishes the separation efficiency performance of the vapor separator and the overall performance of the evaporator system resulting in a lower quality condensate containing non-volatilized product constituents which carryover to the shell of the heat exchanger with the vapor flow. Significant entrainment of liquid droplets in the rising vapor stream can also result in mechanical damage to the mechanical vapor recompression device due to factors such as corrosion or erosion of mechanical surfaces and vibration damage to moving parts. Thus, the embodiments of the present disclosure are configured to address this limitation and improve the separation performance of the vapor separator. Furthermore, the present disclosure addresses this limitation while also decreasing the overall diameter of the vapor separator. By decreasing the overall diameter of the vapor separator, additional heat exchanger tubing may be added to increase the capacity of the evaporator system while still maintaining the overall diameter of the evaporator system to about 14 feet or less, making the system still of a suitable size to be transported over public roads.

Figure 1A:
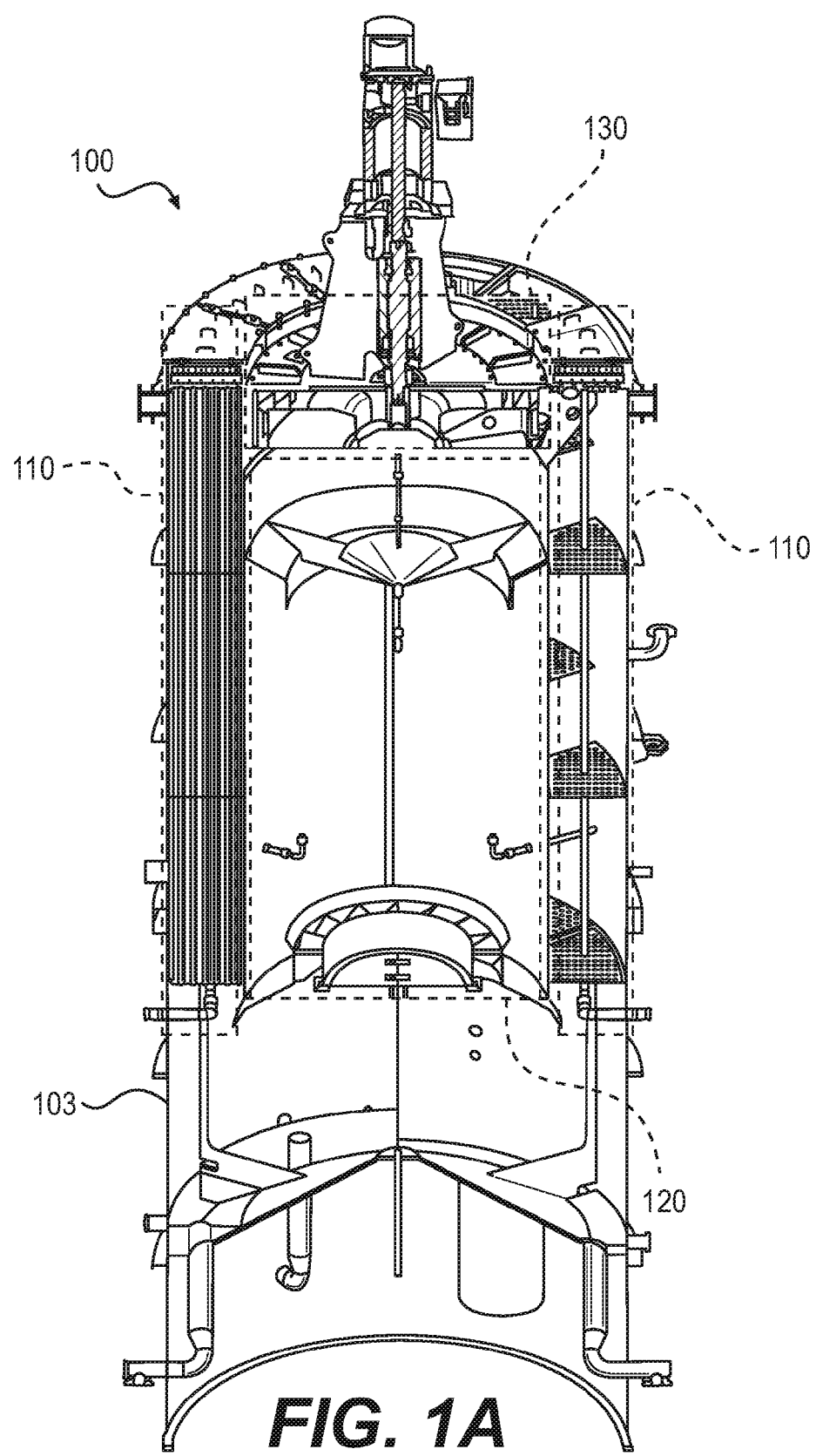
FIG. 1A is a side cut-out illustration of a compact Concentrix mechanical vapor recompression evaporator system, according to an exemplary embodiment.
Figure 1B:
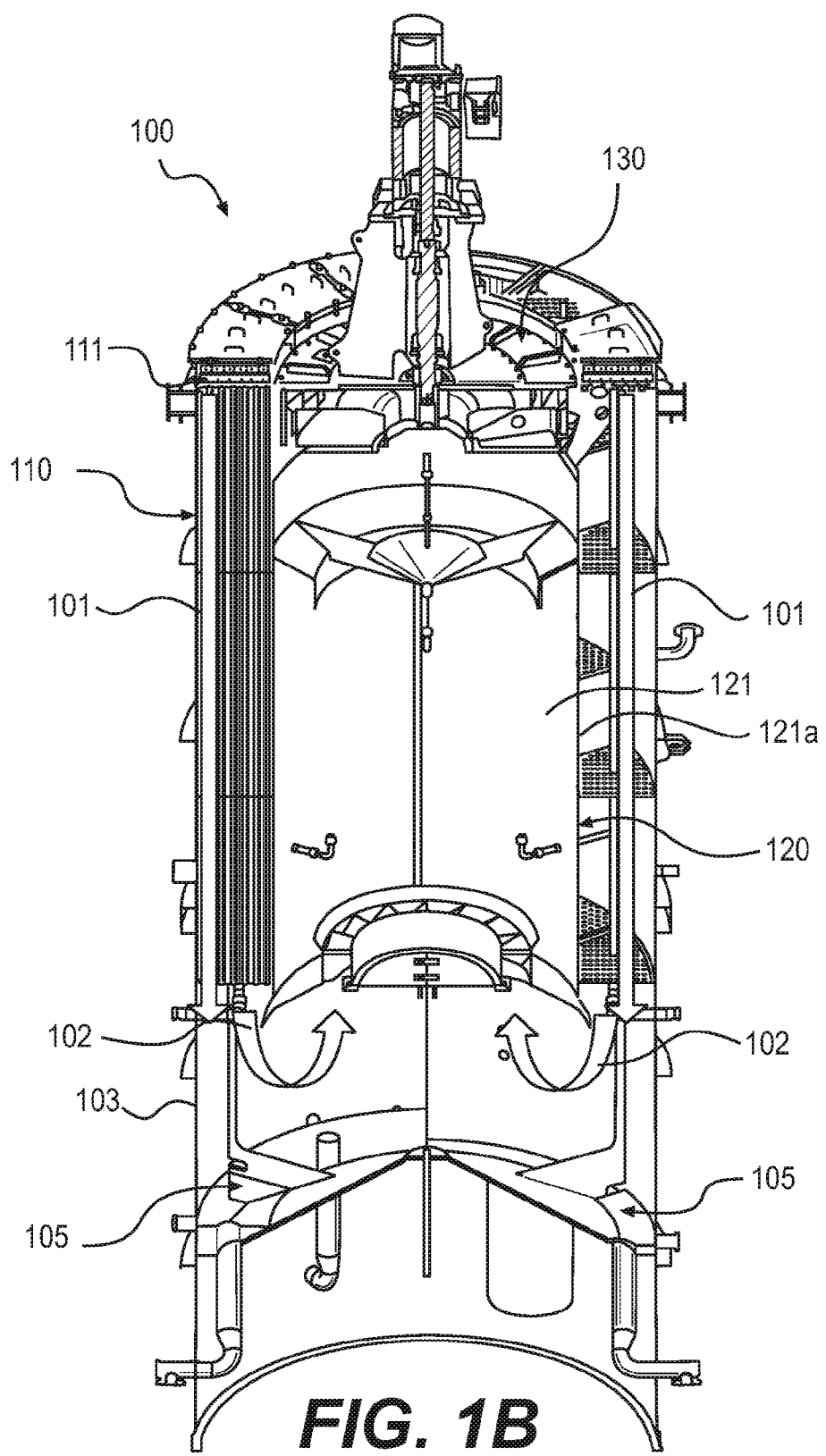
FIG. 1B is a side cut-out illustration of the compact Concentrix mechanical vapor recompression evaporator system of FIG. 1A.

FIGS. 1A and 1B show a side-cutout illustration of a compact Concentrix (CC) mechanical vapor recompression (MVR) evaporator system 100, according to an exemplary embodiment. Similar to the first generation CC, evaporator system 100 can comprise a falling film evaporator 110, a vapor separator 120, and a mechanical vapor recompression (MVR) device 130. As shown in FIG. 1A, falling film evaporator 110, vapor separator 120, and MVR device 130 may all be housed in a common vessel 103. The common vessel may define the overall diameter of evaporator system 100 and this diameter may be about 14 feet or less. Vapor separator 120 can be positioned within common vessel 103, while falling film evaporator 110 can wrap around and surround the outside of vapor separator 120.

As shown in FIG. 1B, falling film evaporator 110 can comprise a vertical tube and shell heat exchanger containing a plurality of tubes (tubes only shown in the left portion). Falling film evaporator 110 can be configured to heat the mass of a liquid 101 flowing downward via gravity inside the plurality of tubes by transfer of thermal energy through the tube walls from the condensing of vapors on the outside of the tube walls. The falling film evaporator can be configured such that liquid 101 can be directed onto the inside walls of the plurality of tubes by distributing liquid 101 in a controlled manner onto the upper surface of a horizontal upper tube sheet 111 of the heat exchanger bundle resulting in a uniform flow of liquid 101 to the upper circumference of the plurality of tubes and down the inside walls via gravity in a thin film. The thickness of the liquid film can be a function of the mass flow rate of liquid 101 relative to the total cross sectional circumference of the plurality of tubes.

As a result of the high ratio of total tube inside wall surface area-to-liquid mass, in combination with the turbulent flow of liquid 101 down the inside of the plurality of tubes, a high rate of thermal heat transfer into liquid 101 can be achieved. This transfer of the thermal energy increases the temperature of liquid 101 inside the tubes, promoting evaporation (e.g., flash evaporation) of volatile components in liquid 101 to a vapor 102 state, increasing the concentration of dissolved and suspended solids remaining in liquid 101.

MVR device 130 can be configured to produce a draft within falling film evaporator 110 through vapor separator 120 and into the suction of MVR device 130. The draft can promote the flow of evaporated vapor 102 co-current with liquid 101 flowing vertically down the inside of the plurality of tubes. As shown in FIG. 1B, as liquid 101 and vapor 102 exit the bottom of the plurality of tubes, liquid 101 can continue to fall due to gravity down into a liquid sump 105, while vapor 102 can be drawn away from liquid 101 by the draft radially inward toward the inlet of vapor separator 120.

In some embodiments, falling film evaporator 110 may be operated under a partial vacuum inside the plurality of tubes enabling evaporation of the volatile components at a lower temperature as compared to atmospheric boiling temperature. Operating at lower temperature can be advantageous for applications where thermal exposure can degrade the quality of the materials in the product (e.g., aqueous food or dairy products).

As shown in FIG. 1B, vapor separator 120 can comprise a cylindrical chamber 121 defined by an outer wall 121A that forms the inner shell of the tube and shell heat exchanger of falling film evaporator 110. Vapor separator 120 can be configured to be concentric to falling film evaporator 110. As shown in FIG. 1B, the bottom of vapor separator 120 can be open fully 360° around its circumference to the space beneath falling film evaporator 110 where liquid 101 and vapor 102 exits from the plurality of tubes. This can allow vapor 102 discharged from the plurality of tubes to be drawn radially inward into the adjacent vapor separator 120 without the need for any interconnecting ductwork.

Figure 2:
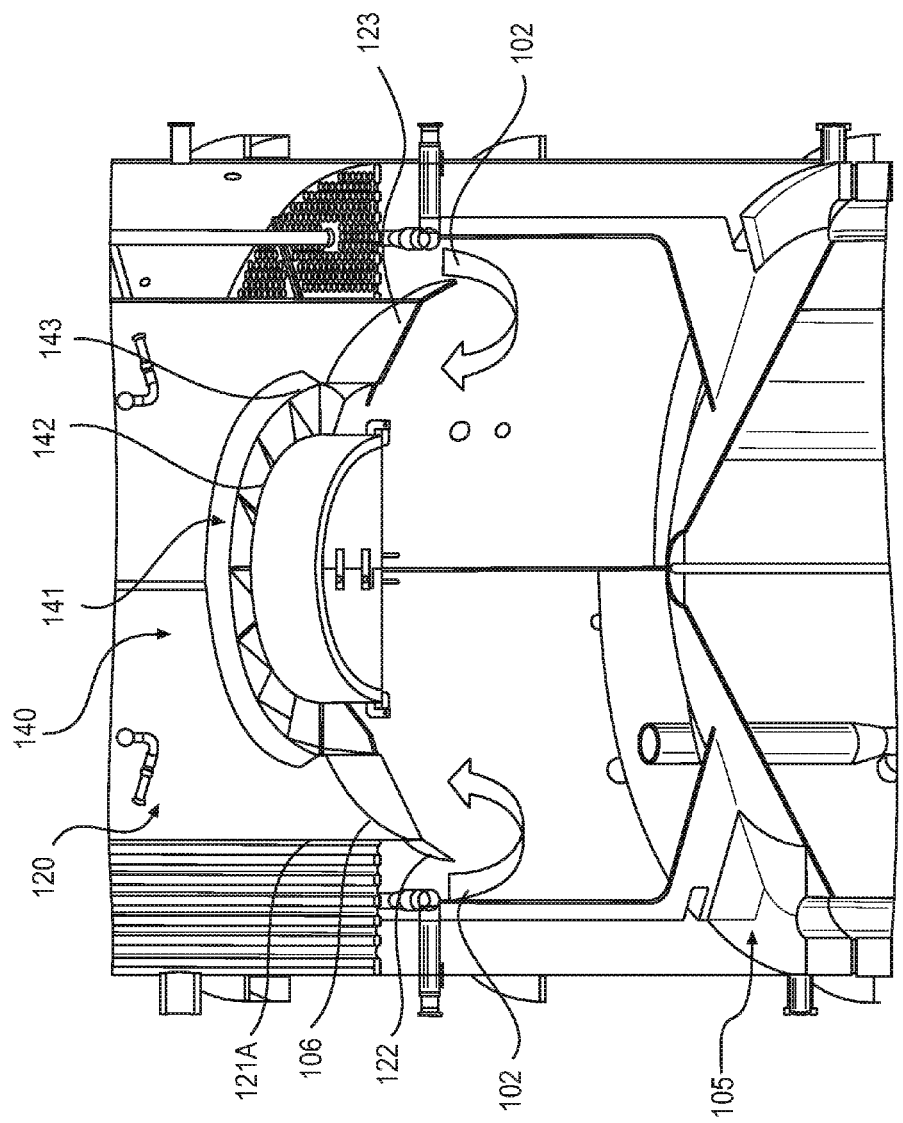
FIG. 2 is an enlarged side cut-out illustration of a portion of the compact Concentrix mechanical vapor recompression evaporator system of FIGS. 1A and 1B.

As shown in FIG. 2, the lower section of outer wall 121A can comprise a first baffle 122, which extends outward away from vapor separator 120. First baffle 122 can act as an obstacle, which causes vapor 102 to drop down and get drawn around first baffle 122 in order to be drawn into vapor separator 120. The centrifugal force caused by the turn around first baffle 122 can cause some entrained liquid droplets within vapor 102 stream to get propelled downward into liquid sump 105 as a result of the increased acceleration. In addition, some of the entrained droplets can get impinged on the surface of first baffle 122. Impinged droplets can coalesce and combine into larger droplets and flow via gravity down the surface of first baffle 122 and fall due to gravity into liquid sump 105 below without re-entrainment into the flow of vapor 102.

Vapor separator 120 can further comprise a spin vane 140, which was not present in the first generation CC design, which utilized a gravity vapor separator. FIG. 2 shows an enlarged cut-out of a portion of evaporator system 100 including spin vane 140. As shown in FIG. 2, spin vane 140 can comprise a plurality of blades 141, an inner guide wall 142, and an outer guide wall 143. Spin vane 140 can be positioned in a horizontal orientation in the inlet to vapor separator 120. Spin vane 140 can be concentric to vapor separator 120 and falling film evaporator 110.

As shown in FIG. 2, a bottom cone 123 can span between the inner surface of wall 121A of vapor separator 120 and the outer surface of outer guide wall 143 of spin vane 140. Bottom cone 123 can span the full 360° degree circumference of vapor separator 120. Bottom cone 123 can be angled upward as it extends from outer wall 121A toward the center of vapor separator 120 until it meets outer guide wall 143. Bottom cone 123 can be configured to seal vapor separator 120 such that all vapor 102 must pass through spin vane 140 (i.e., between blades 141) in order to enter chamber 121 of vapor separator 120. In other embodiments, bottom cone 123 can be configured as one continuous piece or multiple pieces spaced apart from each other to span only a portion of the 360° circumference of vapor separator 120, such that a portion of vapor 102 can pass directly into chamber 121 while the remainder passes through spine vane 140.

Bottom cone 123 can meet outer guide wall 143 at the bottom edge, top edge, or in between. For example, the embodiment shown in FIG. 2, bottom cone 123 meets outer guide wall 143 at the bottom edge of outer guide wall 143. In another embodiment, bottom cone 123 could meet outer guide wall 143 at about half way between the bottom edge and the top edge of outer guide wall 143, which may allow the protruding portion of outer guide wall 143 to act as a second baffle. The second baffle could act similar to first baffle 122, thereby causing some entrained liquid droplets to get propelled downward into liquid sump 105 as a result of the increased acceleration or some of the entrained droplets may get impinged on the surface of the second baffle. The impinged droplets can coalesce and combine into larger droplets and slide down and fall due to gravity into liquid sump 105 below.

Figure 3:
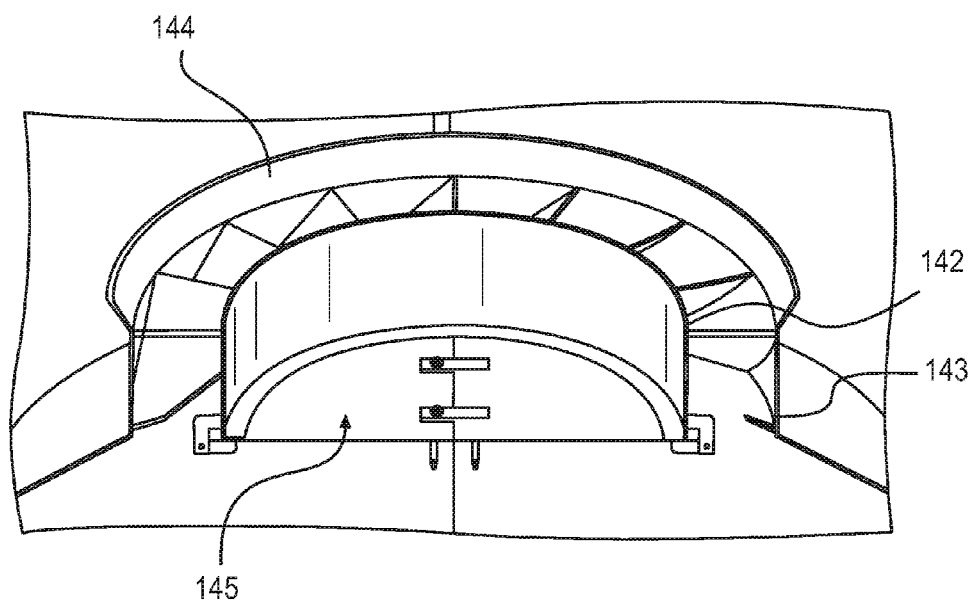
FIG. 3 is an enlarged side cut-out illustration of a portion of a spin vane, according to an exemplary embodiment.

As shown in FIG. 2, spin vane 140 (e.g., inner guide wall 142 and outer guide wall 143) can be concentric to vapor separator 120, falling film evaporator 110, and common vessel 103. FIG. 3 shows an enlarged cut-out of spin vane 140. As shown in FIG. 3, spin vane 140 may further include a vapor expansion baffle 144, which may project upward and outward from the upper edge of outer guide wall 143. Vapor expansion baffle 144 can be configured to direct the flow of vapor 102 exiting spin vane 140 into vapor separator 120 upward. By directing the vapor flow upward, the potential for the flow of vapor 102 to impact droplets near the bottom of vapor separator 120 may be reduced.

As shown in FIG. 3, inner guide wall 142 may define a central region 145 of spin vane 140. Central region 145 may be sealed to force vapor to pass through blades 141. In another embodiment, central region 145 may be partially open or entirely open, thereby allowing vapor 102 to pass through central region 145 into vapor separator 120. It is contemplated that central region 145 may be sealed by way of a man way so that a person (e.g., for maintenance, repair, inspection, or cleaning) may access vapor separator 120 through central region 145. In some embodiments, as shown in FIG. 3, the man way may be hingedly coupled to inner guide wall 142 and may be fastened together in the center. The design of the central region 145 may be configured to meet industrial or sanitary design standards. For example, in some embodiments (e.g., USDA dairy inspected applications) central region 145 may be configured to be free of threaded and bolted connections and be CIP cleanable in order to meet 3-A sanitary standards.

Blades 141 can be releasably or fixedly coupled to inner guide wall 142 and outer guide wall 143 and be spaced evenly around the perimeter of inner guide wall 142. The number of blades 141 can range from one to many (e.g., 5, 6, 7, 8, 9, 10, 12, 14, 16, 18, 20, or more). As shown in FIG. 3, blades 141 can be configured such that no portion of blades 141 extends beyond the upper or lower edge of inner guide wall 142 and outer guide wall 143. In other embodiments, blades 141 can be configured such that a portion of the blades extends above and/or below inner guide wall 142 and/or outer guide wall 143.

Spin vane 140 as shown in FIGS. 1-3 may be stationary within vapor separator 120 during operation. Thus, the addition of spin vane 140 produces no measurable increase in energy requirements for evaporator system 100 besides the nominal increase in pressure drop, which may impose a corresponding nominal increase in the power consumption of the turbofan. In other embodiments, spin vane 140 may be configured to rotate around a central axis. Spin vane 140 rotation could be driven by a motor or spin vane 140 could rotate as a result of the vapor draft drawn through spin vane 140 by MVR device 130.

The components of spin vane 140 (i.e., blades 141, inner guide wall 142, outer guide wall 143, etc.) can be fixedly couple by way of various methods (e.g., welding, fasteners, bonding, adhesive, etc.). According to other embodiments, components can be releasably coupled using various mechanisms (e.g., clips, pins, fasteners, slots, etc.). For example, inner guide wall 142 and blades 141 may be releasable from the remainder of spin vane 140 (i.e., outer guide wall 143).

Easy removal of inner guide wall 142 and blades 141 may be advantageous for several reasons. For example, it may be beneficial to remove inner guide wall 142 and blades 141 during cleaning of evaporator system 100. Additionally, besides cleaning, easy removal of inner guide wall 142 and blades 141 can allow for easy swap out of these components based on application and/or operating parameters. For example, in a food, dairy or beverage application the design of blades 141 (e.g., number of blades, surface area of blades, pitch of blades, etc.) may affect the performance of vapor separator 120 and thus a specific spin vane 140 may be selected such that the vapor condensate is of a desired consistency and quality.

Figure 4:
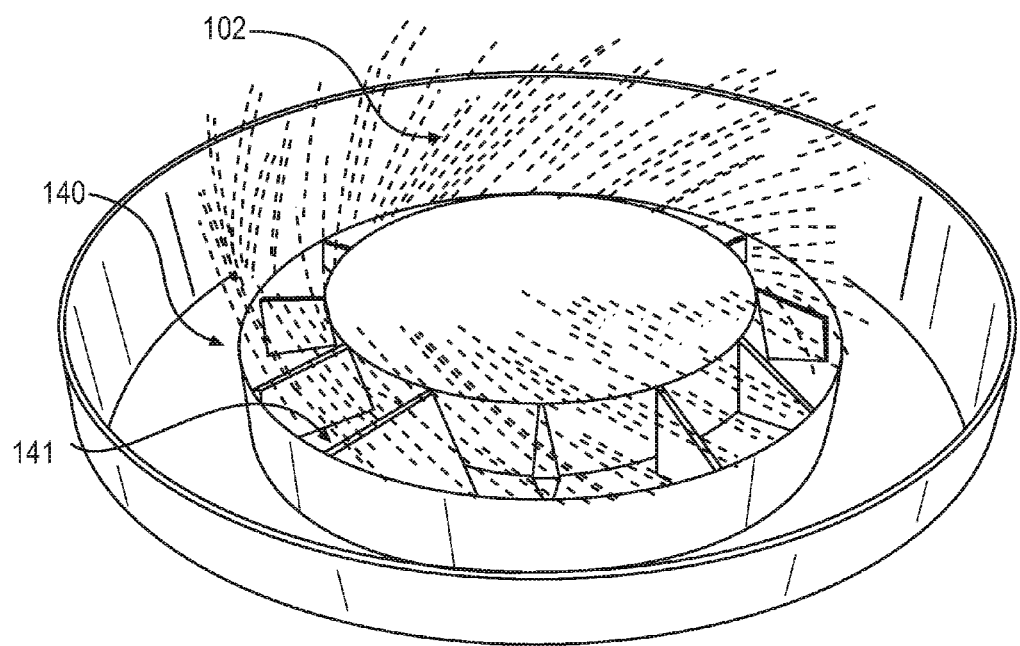
FIG. 4 is a model simulation illustration of the vapor flow through the spin vane of FIG. 3.

Spin vane 140 can be configured such that vapor 102 drawn through spin vane 140 contacts blades 141. By contacting blades 141, vapor 102 can be forced to flow along the surface of blades 141 as vapor 102 can be drawn upward through spin vane 140. As a result, this can cause vapor 102 to exit spin vane 140 tangentially to the surface of blades 141. For example, FIG. 4 is a model simulation illustration that shows the discharge of vapor 102 from spin vane 140. Vapor 102 exiting spin vane 140 can enter chamber 121 and rather than just flowing generally in a straight vertical direction (e.g., as shown in FIG. 5A), instead vapor 102 swirls creating a vortex like effect within chamber 121 (e.g., as shown in FIG. 5B) as vapor 102 is drawn up toward MVR device 130.

Figures 5A, 5B:
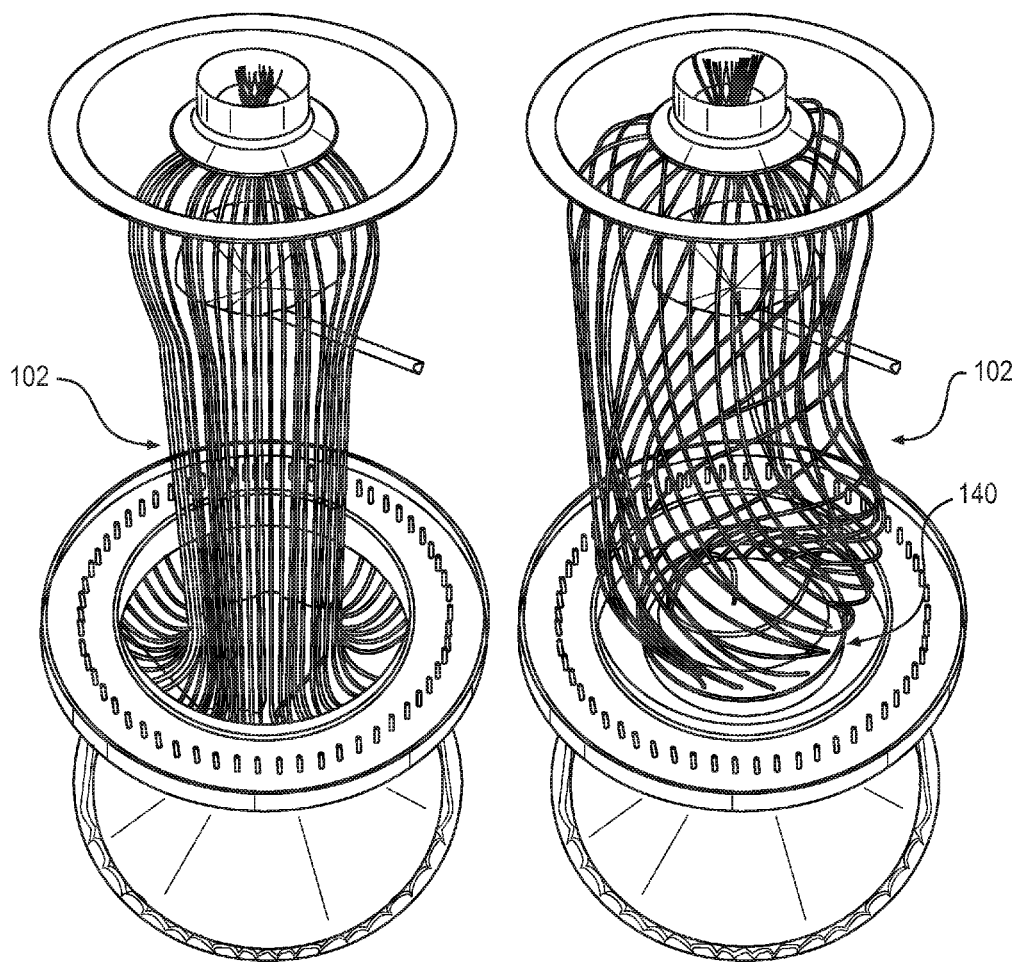
FIG. 5A is a model simulation illustration of the vapor flow through the vapor separator of the first generation CC evaporator system.
FIG. 5B is a model simulation illustration of the vapor flow through the vapor separator of a compact Concentrix mechanical vapor recompression evaporator system, according to an exemplary embodiment.

FIG. 5A is a model simulation illustration of the vapor flow through the vapor separator of the first generation CC evaporator system while FIG. 5B is a model simulation illustration of the vapor flow through vapor separator 120 of system 100. By vapor 102 swirling within chamber 121, as shown in FIG. 5B, rather than just rising vertically, as shown in FIG. 5A, entrained water droplets within vapor 102 can be accelerated toward outer wall 121A of chamber 121 where they can become impinged on the surface and separated from the stream of vapor 102. Droplets which impinge on the surface of outer wall 121A may tend to remain in contact with the wall surface due to liquid surface tension, and may tend to flow downward along the wall surface due to gravity and can be collected in a vapor separator sump 106, as shown in FIG. 3. Droplets collected in vapor separator sump 106 may be routed to liquid sump 105.

In some embodiments, droplet contact surfaces of spin vane 140 and vapor separator 120 may be designed to enable a thorough CIP cleaning in accordance with sanitary standards, including for example, 3-A standards for USDA inspected equipment used for processing of dairy products.

As a result of the swirling of vapor 102 within chamber 121, as shown in FIG. 5B, entrained liquid droplets in addition to accelerating toward outer wall 121A are also more likely to come in contact with one another and coalesce due to the mixing that is occurring. Consequently, as the entrained water droplets combine they increase in size and once reaching a critical mass rather than being drawn up by the draft created by MVR device 130, they can fall due to gravity and can be collected in vapor separator sump 106 along with the other droplets.

In some embodiments, spin vane 140 may be configured such that the direction of spin of the vapor in vapor separator 120 may be the same direction of spin as MVR device 130. Matching the direction of spin may improve the vapor displacement performance of MVR device 130.

Figure 6:
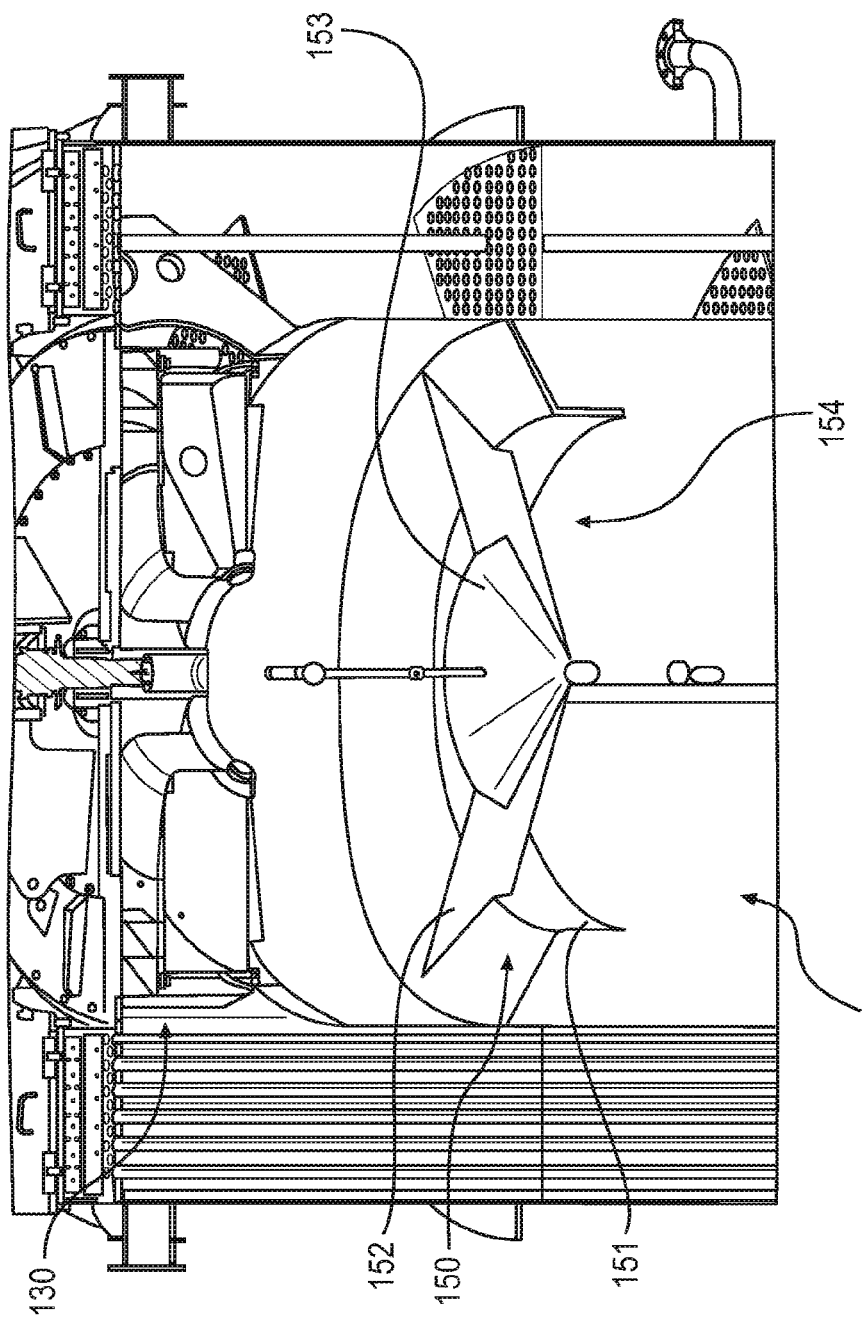
FIG. 6 is an enlarged side cut-out illustration of a portion of the compact concentrix mechanical vapor recompression evaporator system of FIGS. 1A and 1B.

As shown in FIGS. 1A, 1B, and 6, in some embodiments vapor separator 120 may further include a spin reducer 150, which also was not present in the first generation CC design. FIG. 6, shows an enlarged cut-out illustration of spin reducer 150 according to an exemplary embodiment. As shown in FIG. 6, spin reducer 150 may be positioned in a horizontal orientation in an upper region of vapor separator 120, beneath MVR device 130. Spin reducer 150 may be concentric to vapor separator 120. Spin reducer 150 may include an outer wall 151 and one or more partitions 152.

Outer wall 151 may include a lower portion and an upper portion. The lower portion may extend parallel along outer wall 121A of chamber 121. The upper portion may extend from the upper edge of the lower portion radially outward to outer wall 121A of chamber 121. As shown in FIG. 6, the upper portion may slope up from the lower portion. In some embodiments, the upper portion may slope down from the lower portion. The upper and lower portions of outer wall 151 may span the full 360° degree circumference of vapor separator 120. As shown in FIG. 6, outer wall 151 may define a central passage 154. Spin reducer 150 may be configured such that all vapor 102 exiting chamber 121 passes through central passage 154 in order to reach the suction of MVR device 130.

As shown in FIG. 6, one or more partitions 152 may be positioned within central passage 154. The one or more partitions 152 may be vertically oriented and may extend radially outward from the center of central passage 154 to outer wall 151. The number of partitions can range from one to many (e.g., 3, 4, 5, 6, 7, 8, or more) The embodiment shown in FIG. 6, for example, is configured to have 4 partitions 152, although only 2 are shown due to the cutout format of the figure.

Figure 7:
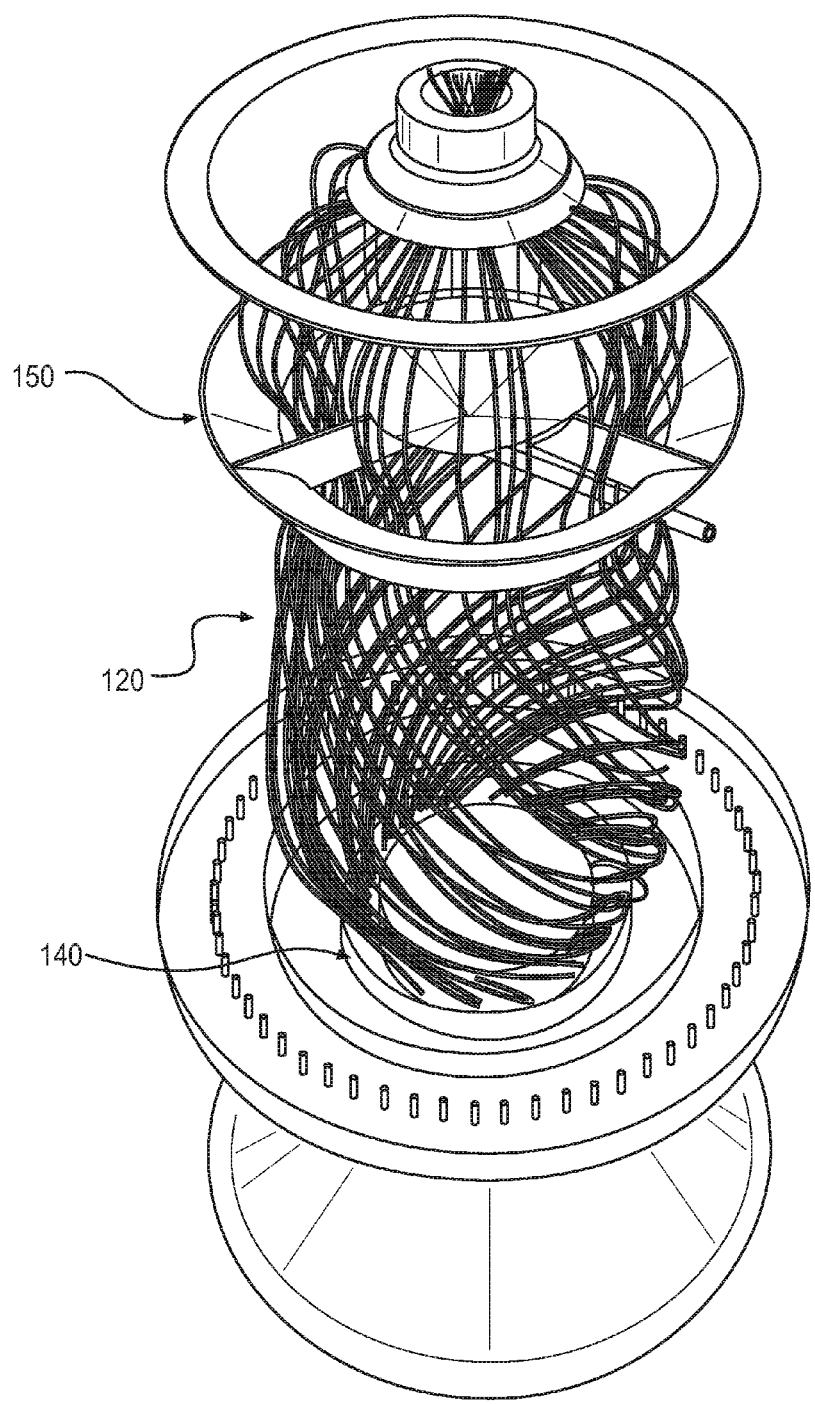
FIG. 7 is a model simulation illustration that shows the flow of vapor through the vapor separator of the system of FIGS. 1A and 1B.

Spin reducer 150 can be configured such that the swirling vapor 102 within vapor separator 120 drawn through spin reducer 150 contacts the vertical partitions 152. By contacting partitions 152, vapor 102 can be redirected to flow vertically along the surface of partitions 152. As a result, spin reducer 150 can reduce the swirling of vapor 102 exiting vapor separator chamber 120. For example, FIG. 7 is a model simulation illustration that shows the flow of vapor 102 through spin reducer 150 into MVR device 130. As shown in FIG. 7, vapor 102 exiting spin reducer 150 can flow more generally in a straight vertical direction as it moves out of vapor separator 120 toward the suction of MVR device 130. By rising vertically instead of swirling, MVR device 130 can achieve greater vapor displacement performance.

As shown in FIG. 6, evaporator system 100 may also include a droplet collection bowl 153, which can define a generally funnel shaped bowl. The first generation CC evaporator system also included a bowl similar to collection bowl 153, however for system 100, collection bowl 153 may be integrated (e.g., supported by) spin reducer 150. Droplet collection bowl 153 can extend over a portion of central passage 154 and can be concentric to central passage 154. Droplet collection bowl 153 can be configured to collect droplets that fall via gravity from MVR device 130 above droplet collection bowl 153. To maximize the likelihood that droplets are caught, a diameter of droplet collection bowl 153 can be greater than a diameter of the suction to MVR device 130, which is from where droplets may fall. Collecting the droplets from MVR device 130 prevents droplets, which have contacted the non-sanitary surfaces of the impeller from falling into portions of vapor separator 120 where product may be collected (i.e., product contact surfaces). Droplet collection bowl 153 can also have a liquid drain configured to direct the collected droplets out of vapor separator 120 separate from the product collected (e.g., in sump 105 or 106).

As discussed herein, spin vane 140 can increase the ability of a vapor separator 120 of a specific diameter to accommodate a significantly greater flow of evaporated vapors while also removing a greater number of entrained liquid droplets from the vapor stream, increasing the system's evaporation capacity (i.e., nominal water evaporation rate (lbs/hr)). For example, the first generation CC system which did not have a spin vane had a nominal water evaporation capacity of up to 70,000 lbs/hr before the diameter of the system exceeded dimensions which allowed for reasonable transportation over public roads (i.e., diameter of about 14 feet or less). Now a comparable size system utilizing spin vane 140 may have a nominal water evaporation capacity of up to 120,000 lbs/hr. Thus, by incorporating spin vane 140 into evaporator system 100, the nominal water evaporation capacity can increase by up to about 70% without increasing the footprint of the system beyond the reasonable transportable limit (i.e., about 14 feet diameter).

Evaporator system 100 can be manufactured of one or more metals, metal alloys, or super duplex alloys, for example, 304 stainless steel, 316 stainless steel, alloy 2205, alloy 2507, titanium, combinations thereof, and the like. The material selected can be based on the composition and concentration of the liquid product.

Evaporator system 100, according to various embodiments, can comprise a plurality of instruments (e.g., temperature transmitters, pressure transmitters, mass flow meters, flow meters, conductivity probes and the like) and a plurality of valves (e.g., ball valves, butterfly valves, control valves, pressure relief valves, and the like). The plurality of instruments and valves can be used to control the flow rate, temperature, concentration, levels of the liquid and vapor products within evaporator system 100.

Evaporator system 100 can further comprise a control system configured to interface with the plurality of instruments, plurality of valves, plurality of pumps and motors to operate evaporator system 100. The control system can include a computer, PLC, or the like that can be programmed to control evaporator system 100 manually, automatically, or a combination of both.

In other embodiments, evaporator system 100 can further comprise additional preheaters and coolers, a feed system having tanks, additional heat exchangers, and the like equipment.

According to various embodiments, evaporator system 100 can be configured to operate in various modes of operation. For example, evaporator system 100 can be operated in a steady state mode or semi-batch mode. Steady state mode can comprise evaporator system 100 continuously receiving liquid product and continuously discharging condensate and concentrate. Semi-Batch mode can comprise evaporator system 100 intermittently receiving liquid product while concentrating liquid product and continuously or intermittently discharging condensate, and then discharging all evaporator system 100 contents as concentrate once final concentration is achieved. Following discharge of all evaporator system 100 contents, the system can restart by refilling with fresh product.

In some embodiments, liquid 101 can be recirculated through falling film evaporator 110 multiple times enabling liquid 101 to be concentrated to higher concentrations. For example, falling film evaporator 110 can be configured as a multi-pass evaporator, such that the discharge of the first pass is supplied to the inlet of the second pass and so forth. The multi-pass evaporator can include 2 or more passes (e.g., 3, 4, 5, 6 or more passes).

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A compact mechanical vapor recompression evaporator system comprising:
    a vapor separator comprising a cylindrical chamber defined by an outer wall;
    a falling film evaporator, wherein the outer wall of the cylindrical chamber forms an inner shell wall of the falling film evaporator, and wherein the outer wall of the cylindrical chamber extends to the bottom of the falling film evaporator;
    a mechanical vapor recompression device positioned above the vapor separator, adjacent an upper end of the falling film evaporator, in fluid communication with the vapor separator via a suction inlet positioned above a center axis of the vapor separator; and
    a spin vane positioned at the inlet to the vapor separator;
    wherein the falling film evaporator is configured to surround an outer wall of the vapor separator, defining a common vessel;
    wherein the mechanical vapor recompression device is configured to induce a draft and draw a vapor from within the falling film evaporator, through the spin vane, into the vapor separator, and into the mechanical vapor recompression device where the vapor is compressed, heated, and discharged horizontally into a shell of the falling film evaporator where the vapor condenses and forms a condensate.

2. The compact mechanical vapor recompression evaporator system of claim 1, wherein the common vessel has a diameter of about 14 feet or less and the compact mechanical vapor recompression system has a nominal water evaporation capacity of up to about 120,000 lbs/hr.

3. The compact mechanical vapor recompression evaporator system of claim 1, wherein the spin vane is stationary.

4. The compact mechanical vapor recompression evaporator system of claim 1, wherein the spin vane is configured such that all vapor entering the vapor separator must pass through the spin vane.

5. The compact mechanical vapor recompression evaporator system of claim 1, wherein the spin vane comprises a plurality of angled blades projecting out from an inner guide wall to an outer guide wall.

6. The compact mechanical vapor recompression evaporator system of claim 5, wherein the spin vane is configured to cause a vapor to exit the spin vane tangential to the plurality of angled blades producing a swirling of vapor within the vapor separator causing coalescing of entrained liquid droplets by direct collision of the droplets and by contact with an inner wall of the vapor separator.

7. The compact mechanical vapor recompression evaporator system of claim 6, wherein the coalescing of entrained liquid droplets increases the mass quantity of entrained liquid droplets disengaged from the vapor by falling or flowing due to gravity to the bottom of the vapor separator.

8. The compact mechanical vapor recompression evaporator system of claim 1, further including a spin reducer positioned in the vapor separator beneath the mechanical vapor recompression device, wherein a draft produced by the mechanical vapor recompression device draws a vapor from the falling film evaporator, through the spine vane, into the vapor separator, through the spin reducer, and into the mechanical vapor recompression device.

9. The compact mechanical vapor recompression evaporator system of claim 8, wherein the spin reducer is configured such that all vapor passing from the vapor separator to the mechanical vapor recompression device must pass through the spin reducer.

10. The compact mechanical vapor recompression evaporator system of claim 8, wherein the spin vane is configured to cause a swirling of vapor within the vapor separator and the spin reducer is configured to decrease the swirling of vapor before the vapor enters the mechanical vapor recompression device.

11. A compact mechanical vapor recompression evaporator system comprising:
   a vapor separator that defines a chamber by an outer wall and a spin vane;
   a falling film evaporator comprising a vertical tube and shell heat exchanger configured to surround the outer wall of the vapor separator forming a common vessel, wherein the outer wall of the cylindrical chamber forms an inner shell wall of the falling film evaporator, and wherein the outer wall of the cylindrical chamber extends to the bottom of the falling film evaporator; and
   a mechanical vapor recompression device located above the vapor separator, adjacent an upper end of the falling film evaporator, in fluid communication with the chamber via a suction inlet positioned above a center axis of the chamber and the shell of the vertical tube and shell heat exchanger and configured to induce a draft within the tubes of the vertical tube and shell heat exchanger through the spin vane and the chamber to the mechanical vapor recompression device;
   wherein the draft causes a vapor formed in the tubes of the vertical tube and shell heat exchanger as a result of evaporation to flow down through the tubes to the bottom of the vertical tube and shell heat exchanger, through the spin vane, into the chamber of the vapor separator, and into the mechanical vapor recompression device where it is compressed, increasing its temperature, and discharged horizontally into a shell of the vertical tube and shell heat exchanger to contact the outer walls of the tubes and form a condensate.

12. The compact mechanical vapor recompression evaporator system of claim 11, wherein the spin vane is configured such that all vapor entering the chamber must pass through the spin vane.

13. The compact mechanical vapor recompression evaporator system of claim 11, wherein the spin vane comprises a plurality of angled blades projecting out from an inner guide wall to an outer guide wall.

14. The compact mechanical vapor recompression evaporator system of claim 11, wherein the spin vane is configured to cause the vapor to exit the spin vane tangential to the plurality of angled blades producing a swirling of vapor within the chamber causing coalescing of entrained liquid droplets.

15. The compact mechanical vapor recompression evaporator system of claim 14, wherein the coalescing of entrained liquid droplets increases the mass quantity of entrained liquid droplets disengaged from the vapor by falling or flowing due to gravity to the bottom of the vapor separator.

16. The compact mechanical vapor recompression evaporator system of claim 11, further including a spin reducer positioned in the vapor separator beneath the mechanical vapor recompression device, wherein spin reducer is configured such that all vapor passing from the vapor separator to the mechanical vapor recompression device must pass through the spin reducer.

17. The compact mechanical vapor recompression evaporator system of claim 16, wherein the spin vane is configured to cause a swirling of vapor within the vapor separator and the spin reducer is configured to decrease the swirling of vapor before the vapor passes to the mechanical vapor recompression device.

* * * * *